May 28, 1957  O. J. GERBRACHT  2,793,909
HYDRAULIC BOOM SUSPENSION
Filed Aug. 2, 1955  2 Sheets-Sheet 1
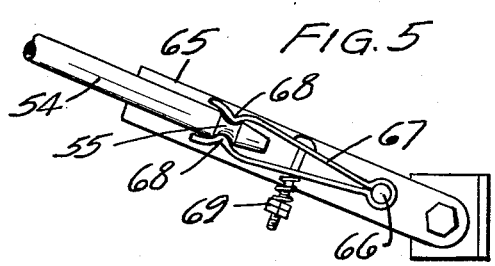
FIG. 5
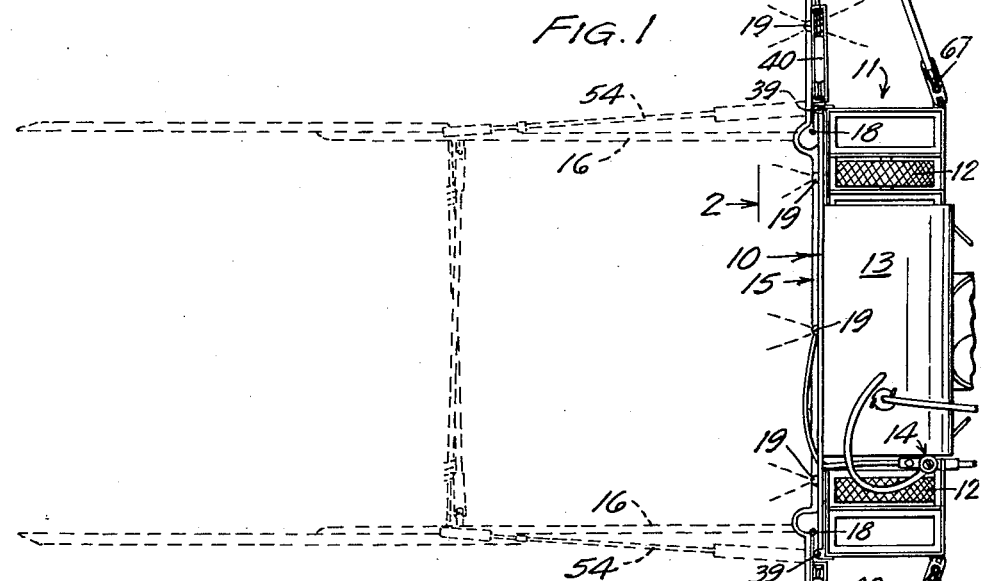
FIG. 1
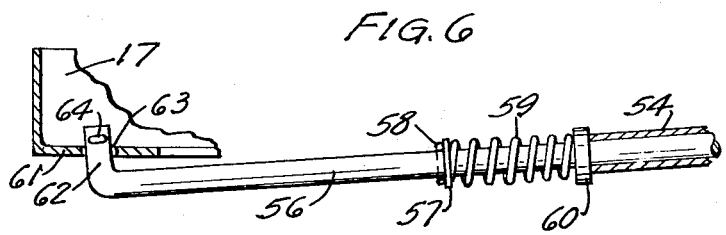
FIG. 6
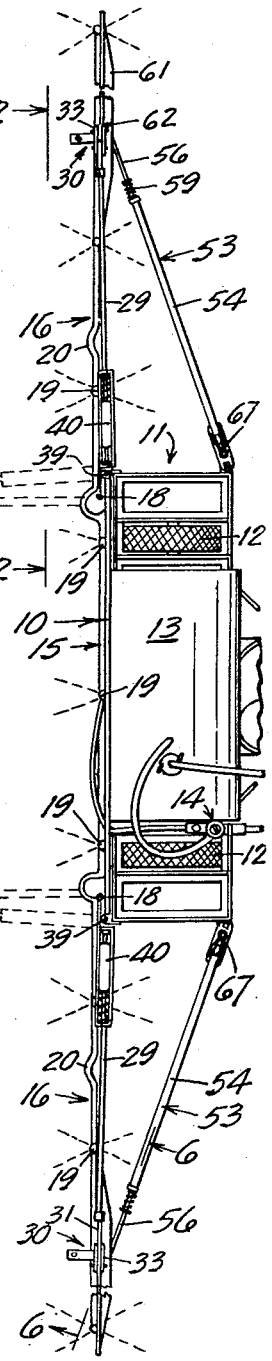
INVENTOR
OSCEOLA J. GERBRACHT
BY Williamson, Schroeder, Adams + Meyers
ATTORNEYS

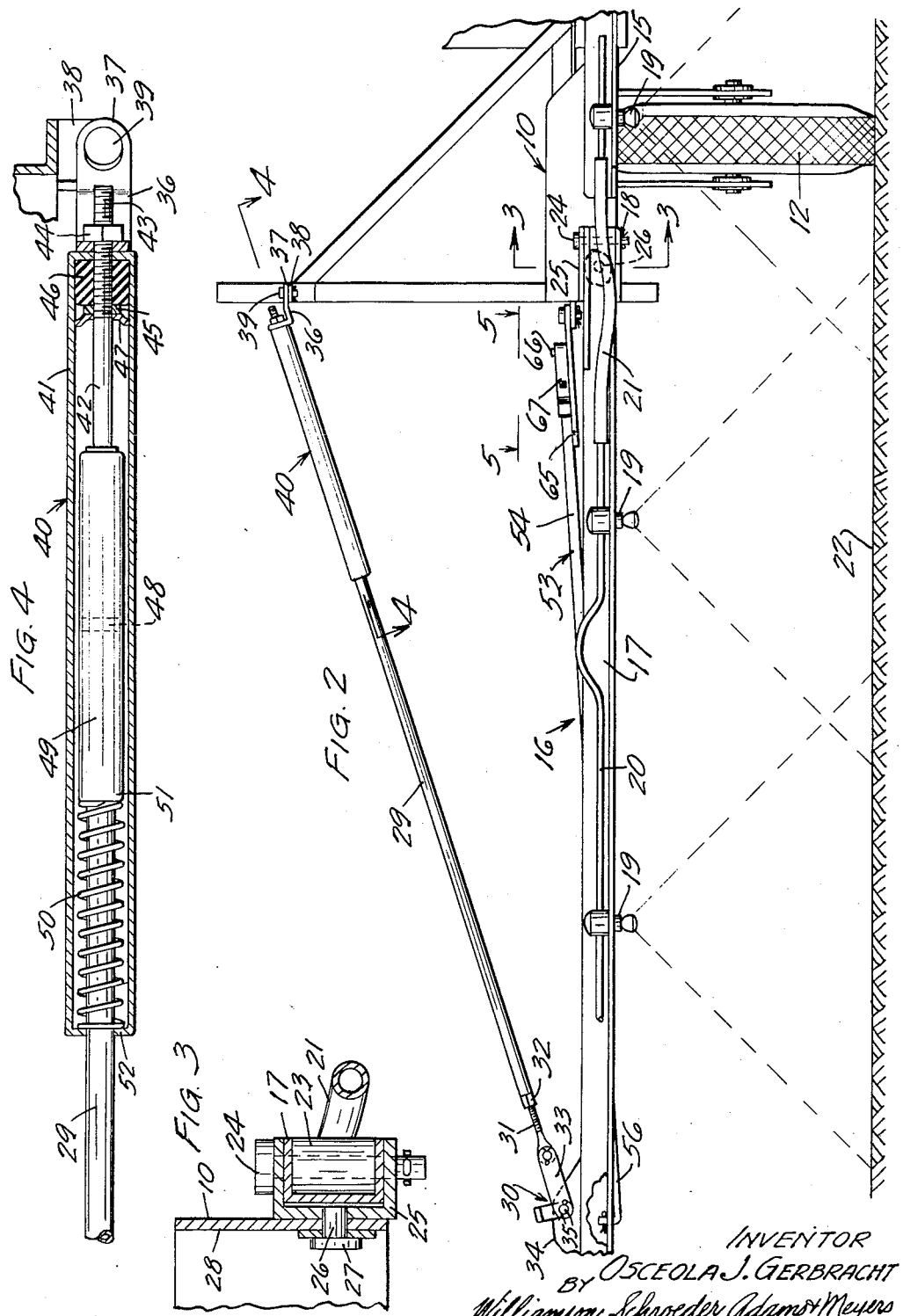

2,793,909
Patented May 28, 1957

2,793,909

HYDRAULIC BOOM SUSPENSION

Osceola J. Gerbracht, Hettinger, N. Dak.

Application August 2, 1955, Serial No. 525,841

2 Claims. (Cl. 299—39)

This invention relates to vehicular spray equipment, and more particularly to a hydraulic boom suspension.

In the prior art, spray equipment has been devised for traveling over the terrain and uniformly applying solutions and emulsions in liquid form for the purpose of fertilizing, killing insects, weeds and the like. Where a comparatively narrow swath is to be treated at one time, it has been customary to provide a rigid spray bar, usually mounted to the rear of the spraying vehicle and provided with spray heads at spaced intervals so that the coverage of the sprayed fluid will be continuous and uniform at the area of application.

However, where it is desired to spray a wider path, the corresponding increase in length of the spray bar causes a problem both in spraying evenly over rolling terrain, and also in traveling from place to place where the length of the spray bar increases the width of the equipment until it becomes difficult to handle during transportation. As a consequence, it has become recognized that folding or collapsing spray bars are desirable in increasing the versatility of spray equipment of the class described. A number of types of extensions have, therefore, been proposed and such extended spray bars or booms generally function well where the terrain is perfectly smooth and where no foreign objects such as rocks, fence posts, trees, hummocks and the like interfere with the spraying operation. Unfortunately, much of the ground to be sprayed is provided with the very objects that cause trouble with spray equipment having boom extensions. Rough ground will cause the booms to oscillate and thereby creates an uneven surging of spray liquid from the spray heads. Furthermore, if the oscillation or whipping is particularly violent, the spray heads may strike the ground and become damaged or broken. If the spray bar extensions or booms happen to strike a solid object such as a rock, the rigid suspension arrangement of the prior art devices is such as to invite breakage of the spray heads or damaging or breaking the outwardly extending boom itself.

It is an important object of this invention to provide a spraying device and boom extension therefor which will overcome the foregoing objections and difficulties encountered in the prior art with the use of simple and economical pivot and shock absorbing members in the boom suspension assembly.

It is a further object of the invention to provide a novel pivotal suspension of a side-mounted spray bar extension which will be movable in a horizontal arc as well as vertically for the purpose of moving the spray bar extensions out of the way when the device is intended to be transported.

It is a still further object of the invention to provide a snubbing and shock-absorbing arrangement whereby a side-mounted spray bar extension will oscillate or whip to a minimum degree under the influence of rough terrain and will be permitted to yield in any direction upon striking an object which normally would break or damage the spray bar, the operability and adjustment of the spray bar being capable of immediate return after such encounter with an obstacle.

These and other objects and advantages of my invention will more fully appear from the following description, made in connection with the accompanying drawing, wherein like reference characters refer to the same parts throughout the several views and in which:

Figure 1 is a plan view of my spray boom assembly attached to the rear of traveling spray equipment, the operative position of the booms and supporting members being shown in full line, and the inoperative traveling position of the booms being indicated in dotted line, unessential portions of the view being cut away;

Figure 2 is an enlarged rear end and elevation of one of the boom elements in extended operative position, portions of the view being cut away to better show the relationship of the parts;

Figure 3 is an enlarged fragmentary vertical section of the boom pivot mount taken on the line 3—3 of Figure 2;

Figure 4 is an enlarged cross sectional view of the supporting strut and shock-absorber taken on the line 4—4 of Figure 2;

Figure 5 is an enlarged top view of a fragment of the snubbing rod at its releasable connection with the supporting frame and looking in the direction of the arrows 5—5 of Figure 2; and Figure 6 is an enlarged sectional view of the snubbing rod and bumper adjacent its interconnection with the spray boom and taken on the line 6—6 of Figure 1.

With continued reference to the drawings, my spray assembly is intended to be mounted on a supporting frame structure 10, as shown in Figs. 1 and 2, which, is associated with conventional spray equipment shown in part at 11 and mounted on wheels 12 for travel over an area to be sprayed. Liquid container 13 may be employed to hold the spraying fluid, and fluid-conveying means indicated generally at 14 may be employed to bring spray fluid under pressure to a rigid spray bar 15 mounted rearwardly of the vehicle and horizontally in spaced clearance with the surface to be sprayed.

My invention comprises an outwardly extending boom and suspension indicated generally at 16 and which is preferably duplicated at each side of the rear of the spray equipment for the purpose of expanding the area to be sprayed as the equipment moves over the ground.

Referring to Fig. 2, my boom assembly comprises a boom arm 17 pivotally mounted at 18 to frame 10 and having a plurality of spray heads 19 mounted thereon, as shown. The spray heads 19 may be supplied from a line 20 which is secured, in turn, to a flexible fluid connector 21 which, in turn, interconnects with the fluid line 14 and spray bar 15. The spray heads 19 are so positioned and adjusted as to cast a spray of fluid downwardly towards an area of the earth 22 so as to uniformly treat the area for the purpose intended.

The pivotal connection 18 is shown in detail in Fig. 3. The boom arm 17 has a bearing 23 rigidly secured to the inner end thereof and is provided with a vertical axis through which pivot pin 24 extends. The pivot pin 24, in turn, is mounted upon a U-shaped bracket 25 so that the boom 17 may swing about the pin 24 in a horizontal manner with the U-shaped bracket in the position shown in Fig. 3. The U-shaped bracket 25 in turn may be mounted upon frame 10 through a stub shaft 26 having an abutment head 27 bearing against an inner surface 28 of frame 10 and providing a horizontal axis for the rotation of bracket 25. The spray boom 17 may thus swing outwardly and rearwardly with respect to the spray equipment 11 and also may move upwardly and downwardly.

Supporting means for the spray boom 17 is provided in pivot bar or strut 29, as shown in Figs. 1 and 2, and this bar or strut is pivotally mounted at 30 to a location intermediate the ends of spray boom 17, as shown in Fig. 2. The pivotal interconnection is preferably effected through a threaded member 31 which is adjustably and threadably mounted within the end 32 of strut 29 for longitudinal adjustment thereof. The outer end is preferably bifurcated at 33 so as to straddle a rigid bracket 34 mounted on spray boom 17 and pivotally secured thereto by pin 35. The upper end of strut 29 terminates in a bracket 36 which is angulated in such a manner as to present an apertured bearing surface 37 adapted to register with a small bracket 38 rigidly secured in turn to frame 10. A pivot pin 39 may pass through the registered apertures and permit the strut 29 to swing in general radial fashion about the axis of pivot pin 39.

The bracket 36 may be attached to the upper end of a shock absorber 40 at the frame portion 41, as shown in Fig. 4. A piston rod 42 is mounted longitudinallly of the shock absorber and its outer threaded end 43 passes through the bracket 36, as shown in Fig. 4. A nut 44 may secure the bracket 36 firmly against the casing 41 at the outside, and a second nut 45 may be threadably mounted to piston rod 42 within casing 41 and in abutment with washer member 46, as shown in Fig. 4. The piston rod 42 is held in medial spaced clearance with casing 41 in its mounted condition by means of the cross brace 47 through which it passes. The piston rod 42 terminates in a piston head 48, as shown in dotted lines and lies within the cylinder 49, as shown. The lower end of casing 41 has a restricted opening for slidably receiving the strut 29 and presents an abutment 52 against which the lower end of compression spring 50 may rest. The hydraulic shock absorber 40 may be of conventional type which will permit slow movement of cylinder 49 with respect to the piston head 48 through escape of hydraulic fluid from one side to the other, all as is well known in the art.

It will be noted that the pivot pin 39 which secures the upper end of strut 29 to the frame 10 is located outwardly and somewhat forwardly of a vertical line passing through the pivot pin 24 which interconnects the spray boom 17 with the frame structure. The advantage of this arrangement will be pointed out under operation of the device.

Referring now to Fig. 1, I also provide a snubbing rod 53 for the purpose of yieldably holding the spray boom 17 in outwardly extending relation with respect to frame 10, yet will permit the rearward movement of the spray boom during transportation or will permit the yielding of the boom if it should strike an immovable object. The snubbing rod 53 comprises an elongated tubular body 54 which terminates at its inner end in a tapered and grooved portion 55 and slidably receives a rod 56 at its outer end. The rod 56, in turn, is provided with a washer 57 and cotter key 58 which passes through the rod 56 and forms an abutment for compression spring 59, as shown in Fig. 6. Another washer 60 abuts against the inner end of compression spring 59 and against the outer end of tubular body 54. The rod 56 is pivotally secured to an outwardly extending rigid flange 61 which is formed on spray boom 17, as shown in Fig. 6. The pivotal connection may be made simply by bending the outer end of rod 56 into an L-shaped portion 62 and passing the end 62 through an opening 63 formed in flange 61, then providing the extending portion 62 with a cotter pin 64, all as shown in the enlarged fragmentary view of Fig. 6.

Referring now to Fig. 5, a bracket 65 which is attached to frame 10 has a vertical pin 66 secured thereto. a spring catch 67 is pivotally mounted on the pin 66 so that it can arcuately swing in a horizontal path therearound and in contact with bracket 65. The spring clip has inwardly converging abutments 68, and, further, has a threadable adjustment member 69 which may be tightened to increase the converging resilience of the abutment portion 68. The grooved reduced end 55 of the snubbing rod 53 is adapted to be lifted out of the spring catch 67 and may be secured thereto by pressing downwardly with the grooved end 55 in secure relation between the resiliently converging abutments 68.

*Operation*

In the use and operation of my boom suspension, the members are swung to the full line position as shown in Figs. 1 and 2, so that the spray boom will extend outwardly from the frame 10 and preferably in alignment with the fixed spray bar 15. As previously pointed out, the spray equipment may be provided with a pair of spray booms in which case the boom at the other side of the device may or may not be utilized in extending condition since the booms are independently operable. With the spray boom positioned outwardly, the snubbing rod is latched in its spring catch 67, as shown in Fig. 5, and the pivot bar or strut 29 will maintain the spray boom in substantially horizontal and outwardly extending position. As the spraying equipment travels over the terrain, the wheels 12 may sink into openings or strike ridges and the like in the ground, thereby causing the equipment to rock and lurch. Should the spray heads or spray boom strike the ground during such operation, the shock absorber 40 will permit the boom to yield in a vertical direction. Similarly, if the entire forward travel of the spray equipment should be jerky or should suddenly stop and the momentum of the spray boom is such as to tend to carry it forward, then the bumper spring 59 on the snubbing rod will take up the shock imparted thereto.

In the event the spray boom should strike a rock or other immovable object, then, of course, the safety feature of the catch shown in Fig. 5 comes into play. The tension on the converging spring latch 67 is so adjusted at 69 that an unusual thrust rearwardly along the snubbing rod 53 will cause the reduced grooved end portion to snap out of its latched position and thereby permit the boom to swing rearwardly and free of the obstacle which it has encountered.

When it is desired to transport the equipment from one place to another, the snubbing rod 53 may be lifted out of its spring catch and the entire boom swung rearwardly. The pivot connection of the upper end of strut 29 is so positioned with respect to the lower pivotal mount of the boom 17 with the frame 10, that the rearward swinging movement will cause the boom to rise to some degree. It is preferred that the upper pivotal interconnection be out of alignment with a vertical line passing through the lower, and that the upper pivotal interconnection between the frame and the strut member be both outward and forward of such vertical line. The upward position of the boom will, thus, be assured when it is swung rearwardly into transportation position. The snubbing rod 53 may be swung across to secure the opposite spray boom, as shown in Fig. 1, where the dotted line configuration indicates the position of the spray booms in rearwardly and upwardly secured position with the respective snubbing rods extending across in appropriately secured relation. Since the flexible fluid connector 21 permits the moving of the spray booms, there need be no disconnection of the fluid line and spraying can be immediately resumed as soon as the spray booms are swung into outward position.

It may thus be seen that my novel boom suspension not only provides for efficient operation during use, but also has a number of cooperative safety features which will minimize breakage and damage to the spray booms and spray heads during operation of the spraying equipment and during transportation as well.

It will, of course, be understood that various changes may be made in the form, details, arrangement and proportion of the parts.

What I claim is:

1. A boom suspension for traveling spray equipment comprising, a supporting frame, a spray boom mounted pivotally to said supporting frame and swingable from an outwardly horizontal position to a rearwardly extending position with respect to the direction of travel of the equipment, a resilient supporting strut pivotally secured intermediate the ends of said spray boom and extending upwardly and somewhat forwardly to said supporting frame, a pivotal interconnection between the resilient supporting strut and said supporting frame whereby to yieldably support the spray boom at an outwardly extending horizontal position and at a somewhat raised rearwardly extending position with respect to the direction of travel of the spray equipment, a resilient snubbing element pivotally secured intermediate the ends of said boom suspension and adapted to extend forwardly for attachment to said supporting frame, and a safety catch at the point of interconnection between said snubbing element and the supporting frame permitting rearward swinging of the spray boom should the boom strike a dangerous obstacle during operation thereof.

2. A boom suspension for traveling spray equipment comprising, a supporting frame, a spray boom mounted pivotally to said support frame and swingably from an outwardly horizontal position to a rearwardly extending position with respect to the direction of travel of the equipment, a resilient supporting strut pivotally secured intermediate the ends of said spray boom and extending upwardly and somewhat forwardly to said supporting frame, a pivotal interconnection between the resilient supporting strut and said supporting frame whereby to yieldably support the spray boom at an outwardly extending horizontal position and at a somewhat raised rearwardly extending position with respect to the direction of travel of the spray equipment, a longitudinally extensible and retractible rod spring-biased to bracing position from a medial point on the boom and adapted to extend forwardly in secured relation with the supporting frame, and a releasable catch interposed between the boom and supporting frame permitting the rod to break connection therebetween upon application of a force greater than a predetermined amount which would normally permit the spring-biased rod to return to its normal bracing position.

References Cited in the file of this patent

UNITED STATES PATENTS

| | | |
|---|---|---|
| 978,082 | Wallace | Dec. 6, 1910 |
| 2,548,482 | Kouril | Apr. 10, 1951 |
| 2,608,437 | Morrison | Aug. 26, 1952 |
| 2,619,379 | Skifte | Nov. 25, 1952 |

FOREIGN PATENTS

| | | |
|---|---|---|
| 718,758 | Great Britain | Nov. 17, 1954 |